(12) United States Patent
Novik et al.

(10) Patent No.: US 10,719,765 B2
(45) Date of Patent: Jul. 21, 2020

(54) CONDITIONAL BEHAVIORAL BIOMETRICS

(71) Applicant: AimBrain Solutions Ltd, London (GB)

(72) Inventors: Alesis Novik, London (GB); Andrius Sutas, London (GB)

(73) Assignee: BIOCATCH LTD., Tel Aviv (IL)

( * ) Notice: Subject to any disclaimer, the term of this patent is extended or adjusted under 35 U.S.C. 154(b) by 130 days.

(21) Appl. No.: 15/192,845

(22) Filed: Jun. 24, 2016

(65) Prior Publication Data
US 2017/0177999 A1    Jun. 22, 2017

(30) Foreign Application Priority Data
Jun. 25, 2015    (GB) .................................. 1511230.3

(51) Int. Cl.
*G06F 21/00* (2013.01)
*G06N 3/12* (2006.01)
(Continued)

(52) U.S. Cl.
CPC ........... *G06N 3/126* (2013.01); *G06F 21/316* (2013.01); *G06F 21/32* (2013.01);
(Continued)

(58) Field of Classification Search
CPC .... G06F 21/32; G06N 3/126; G06K 9/00892; G06K 9/6218; G06K 9/6282; G06K 9/6293
See application file for complete search history.

(56) References Cited

U.S. PATENT DOCUMENTS

| | | |
|---|---|---|
| 3,618,019 A | 11/1971 | Nemirovsky |
| 3,699,517 A | 10/1972 | Dyche |

(Continued)

FOREIGN PATENT DOCUMENTS

| | | |
|---|---|---|
| EP | 2410450 A1 | 1/2012 |
| EP | 2477136 A1 | 7/2012 |

(Continued)

OTHER PUBLICATIONS

GB Application Search Report for Application No. GB1511230.3, dated May 24, 2016.
(Continued)

*Primary Examiner* — Jeffrey C Pwu
*Assistant Examiner* — Thong P Truong
(74) *Attorney, Agent, or Firm* — Eitan Mehulal Sadot

(57) ABSTRACT

The present invention relates to an improved method of providing identification of a user or authentication of a user's identity. More particularly, the present invention relates to an improved method of providing identification of a user or authentication of a user's identity using conditional behavioural biometrics.

The present invention seeks to provide an enhanced method of authenticating and/or identifying a user identity using conditional behavioural biometrics.

According to a first aspect of the present invention, there is provided a method of generating a user profile for use in identifying and/or authenticating a user on a device, the device equipped with one or more sensors, the method comprising: generating a set of data points from sensory data collected by the one or more sensors; clustering the set of data points to produce a set of data clusters; developing a first classifier for the data clusters, the first classifier being operable to assign a further data point derived from a further user interaction with the computing device to one of the data clusters; and developing one or more further classifiers for at least one of the data clusters, the further classifier operable to identify and/or authenticate a user identity based on the further data point.

12 Claims, 2 Drawing Sheets

(51) Int. Cl.
  *G06F 21/32* (2013.01)
  *G06K 9/62* (2006.01)
  *G06F 21/31* (2013.01)
  *G06K 9/00* (2006.01)

(52) U.S. Cl.
  CPC ....... *G06K 9/00892* (2013.01); *G06K 9/6218* (2013.01); *G06K 9/6282* (2013.01); *G06K 9/6293* (2013.01)

(56) References Cited

U.S. PATENT DOCUMENTS

| | | |
|---|---|---|
| 3,983,535 A | 9/1976 | Herbst |
| 4,128,829 A | 12/1978 | Herbst |
| 4,621,334 A | 11/1986 | Garcia |
| 4,760,386 A | 7/1988 | Heath |
| 4,805,222 A | 2/1989 | Young |
| 5,305,238 A | 4/1994 | Starr |
| 5,442,342 A | 8/1995 | Kung |
| 5,485,171 A | 1/1996 | Copper |
| 5,557,686 A | 9/1996 | Brown |
| 5,565,657 A | 10/1996 | Merz |
| 5,581,261 A | 12/1996 | Hickman |
| 5,838,306 A | 11/1998 | O'Connor |
| 5,874,941 A | 2/1999 | Yamada |
| 5,999,162 A | 12/1999 | Takahashi |
| 6,202,023 B1 | 3/2001 | Hancock |
| 6,337,686 B2 | 1/2002 | Wong |
| 6,337,919 B1 | 1/2002 | Dunton |
| 6,442,692 B1 | 8/2002 | Zilberman |
| 6,572,014 B1 | 6/2003 | Lambert |
| 6,819,219 B1 | 11/2004 | Bolle |
| 6,836,554 B1 | 12/2004 | Bolle |
| 6,895,514 B1 | 5/2005 | Kermani |
| 6,931,131 B1 | 8/2005 | Becker |
| 6,938,061 B1 | 8/2005 | Rumynin |
| 6,938,159 B1 | 8/2005 | O'Connor |
| 6,957,185 B1 | 10/2005 | Labaton |
| 6,957,186 B1 | 10/2005 | Guheen |
| 6,983,061 B2 | 1/2006 | Ikegami |
| 7,092,926 B2 | 8/2006 | Cerrato |
| 7,130,452 B2 | 10/2006 | Bolle |
| 7,133,792 B2 | 11/2006 | Murakami |
| 7,139,916 B2 | 11/2006 | Billingsley |
| 7,158,118 B2 | 1/2007 | Liberty |
| 7,236,156 B2 | 6/2007 | Liberty |
| 7,245,218 B2 | 7/2007 | Ikehara |
| 7,366,919 B1 | 4/2008 | Sobel |
| 7,395,436 B1 | 7/2008 | Nemovicher |
| 7,494,061 B2 | 2/2009 | Reinhold |
| 7,523,191 B1 | 4/2009 | Thomas |
| 7,535,456 B2 | 5/2009 | Liberty |
| 7,606,915 B1 | 10/2009 | Calinov |
| 7,796,013 B2 | 9/2010 | Murakami |
| 7,818,290 B2 | 10/2010 | Davis |
| 7,860,870 B2 | 12/2010 | Sadagopan |
| 8,031,175 B2 | 10/2011 | Rigazio |
| 8,065,624 B2 | 11/2011 | Morin |
| 8,125,312 B2 | 2/2012 | Orr |
| 8,156,324 B1 | 4/2012 | Shnowske |
| 8,170,953 B1 | 5/2012 | Tullis |
| 8,201,222 B2 | 6/2012 | Inoue |
| 8,244,211 B2 | 8/2012 | Clark |
| 8,285,658 B1 | 10/2012 | Kellas-Dicks |
| 8,417,960 B2 | 4/2013 | Takahashi |
| 8,433,785 B2 | 4/2013 | Awadallah |
| 8,449,393 B2 | 5/2013 | Sobel |
| 8,499,245 B1 | 7/2013 | Froment |
| 8,510,113 B1 | 8/2013 | Conkie |
| 8,548,208 B2 | 10/2013 | Schultz |
| 8,549,629 B1 | 10/2013 | McCreesh |
| 8,555,077 B2 | 10/2013 | Davis |
| 8,621,209 B1 | 12/2013 | Johansson |
| 8,745,729 B2 | 6/2014 | Poluri |
| 8,788,838 B1 | 8/2014 | Fadell |
| 8,803,797 B2 | 8/2014 | Scott |
| 8,819,812 B1 | 8/2014 | Weber |
| 8,832,823 B2 | 9/2014 | Boss |
| 8,838,060 B2 | 9/2014 | Walley |
| 8,880,441 B1 | 11/2014 | Chen |
| 8,898,787 B2 | 11/2014 | Thompson |
| 8,938,787 B2 | 1/2015 | Turgeman |
| 8,941,466 B2 | 1/2015 | Bayram |
| 8,990,959 B2 | 3/2015 | Zhu |
| 9,069,942 B2 | 6/2015 | Turgeman |
| 9,071,969 B2 | 6/2015 | Turgeman |
| 9,154,534 B1 | 10/2015 | Gayles |
| 9,174,123 B2 | 11/2015 | Nasiri |
| 9,195,351 B1 | 11/2015 | Rosenberg |
| 9,203,860 B1 | 12/2015 | Casillas |
| 9,275,337 B2 | 3/2016 | Turgeman |
| 9,282,112 B2 | 3/2016 | Filatov |
| 9,301,140 B1 | 3/2016 | Costigan |
| 9,304,915 B2 | 4/2016 | Adams |
| 9,355,231 B2 | 5/2016 | Disraeli |
| 9,355,234 B1 | 5/2016 | Magi Shaashua |
| 9,418,221 B2 | 8/2016 | Turgeman |
| 9,430,629 B1 | 8/2016 | Ziraknejad |
| 9,450,971 B2 | 9/2016 | Turgeman |
| 9,477,826 B2 | 10/2016 | Turgeman |
| 9,483,292 B2 | 11/2016 | Turgeman |
| 9,526,006 B2 | 12/2016 | Turgeman |
| 9,529,987 B2 | 12/2016 | Deutschmann |
| 9,531,701 B2 | 12/2016 | Turgeman |
| 9,531,733 B2 | 12/2016 | Turgeman |
| 9,536,071 B2 | 1/2017 | Turgeman |
| 9,541,995 B2 | 1/2017 | Turgeman |
| 9,547,766 B2 | 1/2017 | Turgeman |
| 9,552,470 B2 | 1/2017 | Turgeman |
| 9,558,339 B2 | 1/2017 | Turgeman |
| 9,589,120 B2 | 3/2017 | Samuel |
| 9,621,567 B2 | 4/2017 | Turgeman |
| 9,626,677 B2 | 4/2017 | Turgeman |
| 9,654,485 B1 | 5/2017 | Neumann |
| 9,665,703 B2 | 5/2017 | Turgeman |
| 9,674,218 B2 | 6/2017 | Turgeman |
| 9,690,915 B2 | 6/2017 | Turgeman |
| 9,703,953 B2 | 7/2017 | Turgeman |
| 9,710,316 B1 | 7/2017 | Chheda |
| 9,712,558 B2 | 7/2017 | Turgeman |
| 9,747,436 B2 | 8/2017 | Turgeman |
| 9,779,423 B2 | 10/2017 | Turgeman |
| 9,838,373 B2 | 12/2017 | Turgeman |
| 9,848,009 B2 | 12/2017 | Turgeman |
| 9,927,883 B1 | 3/2018 | Lin |
| 10,032,010 B2 | 7/2018 | Turgeman |
| 10,037,421 B2 | 7/2018 | Turgeman |
| 10,049,209 B2 | 8/2018 | Turgeman |
| 10,055,560 B2 | 8/2018 | Turgeman |
| 10,069,837 B2 | 9/2018 | Turgeman |
| 10,069,852 B2 | 9/2018 | Turgeman |
| 10,079,853 B2 | 9/2018 | Turgeman |
| 10,083,439 B2 | 9/2018 | Turgeman |
| 10,164,985 B2 | 12/2018 | Turgeman |
| 10,198,122 B2 | 2/2019 | Turgeman |
| 10,262,324 B2 | 4/2019 | Turgeman |
| 10,298,614 B2 | 5/2019 | Turgeman |
| 10,395,018 B2 | 8/2019 | Turgeman |
| 10,397,262 B2 | 8/2019 | Karabchevsky |
| 10,404,729 B2 | 9/2019 | Turgeman |
| 10,474,815 B2 | 11/2019 | Turgeman |
| 10,476,873 B2 | 11/2019 | Turgeman |
| 10,523,680 B2 | 12/2019 | Turgeman |
| 10,579,784 B2 | 3/2020 | Turgeman |
| 10,586,036 B2 | 3/2020 | Turgeman |
| 10,621,585 B2 | 4/2020 | Turgeman |
| 2001/0004733 A1 | 6/2001 | Eldering |
| 2002/0023229 A1 | 2/2002 | Hangai |
| 2002/0089412 A1 | 7/2002 | Heger |
| 2003/0033526 A1 | 2/2003 | French |
| 2003/0074201 A1 | 4/2003 | Grashey |
| 2003/0137494 A1 | 7/2003 | Tulbert |
| 2003/0149803 A1 | 8/2003 | Wilson |
| 2003/0212811 A1 | 11/2003 | Thornton |

(56) References Cited

U.S. PATENT DOCUMENTS

| | | |
|---|---|---|
| 2004/0015714 A1 | 1/2004 | Abraham |
| 2004/0017355 A1 | 1/2004 | Shim |
| 2004/0021643 A1 | 2/2004 | Hoshino |
| 2004/0034784 A1 | 2/2004 | Fedronic |
| 2004/0062423 A1 | 4/2004 | Doi |
| 2004/0111523 A1 | 6/2004 | Hall |
| 2004/0123156 A1 | 6/2004 | Hammond |
| 2004/0128240 A1 | 7/2004 | Yusin |
| 2004/0143737 A1 | 7/2004 | Teicher |
| 2004/0186882 A1 | 9/2004 | Ting |
| 2004/0221171 A1 | 11/2004 | Ahmed |
| 2005/0008148 A1 | 1/2005 | Jacobson |
| 2005/0060138 A1 | 3/2005 | Wang |
| 2005/0179657 A1 | 8/2005 | Russo |
| 2005/0289264 A1 | 12/2005 | Illowsky |
| 2006/0006803 A1 | 1/2006 | Huang |
| 2006/0080263 A1 | 4/2006 | Willis |
| 2006/0090073 A1 | 4/2006 | Steinberg |
| 2006/0123101 A1 | 6/2006 | Buccella |
| 2006/0143454 A1 | 6/2006 | Walmsley |
| 2006/0195328 A1 | 8/2006 | Abraham |
| 2006/0215886 A1 | 9/2006 | Black |
| 2006/0224898 A1 | 10/2006 | Ahmed |
| 2006/0238490 A1 | 10/2006 | Stanley |
| 2006/0280339 A1 | 12/2006 | Cho |
| 2006/0282660 A1 | 12/2006 | Varghese |
| 2006/0284969 A1 | 12/2006 | Kim |
| 2007/0118804 A1 | 5/2007 | Raciborski |
| 2007/0156443 A1 | 7/2007 | Gurvey |
| 2007/0174082 A1 | 7/2007 | Singh |
| 2007/0183633 A1 | 8/2007 | Hoffmann |
| 2007/0214426 A1 | 9/2007 | Ruelle |
| 2007/0226797 A1 | 9/2007 | Thompson |
| 2007/0236330 A1 | 10/2007 | Cho |
| 2007/0240230 A1 | 10/2007 | O'Connell |
| 2007/0241861 A1 | 10/2007 | Venkatanna |
| 2007/0250920 A1 | 10/2007 | Lindsay |
| 2007/0255821 A1 | 11/2007 | Ge |
| 2007/0266305 A1 | 11/2007 | Cong |
| 2007/0271466 A1 | 11/2007 | Mak |
| 2007/0283416 A1 | 12/2007 | Renaud |
| 2008/0046982 A1 | 2/2008 | Parkinson |
| 2008/0059474 A1 | 3/2008 | Lim |
| 2008/0068343 A1 | 3/2008 | Hoshino |
| 2008/0084972 A1 | 4/2008 | Burke |
| 2008/0091453 A1* | 4/2008 | Meehan ............... G06Q 20/341 705/317 |
| 2008/0091639 A1 | 4/2008 | Davis |
| 2008/0092209 A1 | 4/2008 | Davis |
| 2008/0092245 A1 | 4/2008 | Alward |
| 2008/0097851 A1 | 4/2008 | Bemmel |
| 2008/0098456 A1 | 4/2008 | Alward |
| 2008/0120717 A1 | 5/2008 | Shakkarwar |
| 2008/0136790 A1 | 6/2008 | Hio |
| 2008/0162449 A1 | 7/2008 | Chao-Yu |
| 2008/0183745 A1 | 7/2008 | Cancel |
| 2008/0192005 A1 | 8/2008 | Elgoyhen |
| 2008/0200310 A1 | 8/2008 | Tagliabue |
| 2008/0211766 A1 | 9/2008 | Westerman |
| 2008/0215576 A1 | 9/2008 | Zhao |
| 2008/0263636 A1 | 10/2008 | Gusler |
| 2008/0298588 A1 | 12/2008 | Shakkarwar |
| 2008/0301808 A1 | 12/2008 | Calo |
| 2008/0306897 A1 | 12/2008 | Liu |
| 2008/0309616 A1 | 12/2008 | Massengill |
| 2009/0037983 A1 | 2/2009 | Chiruvolu |
| 2009/0038010 A1 | 2/2009 | Ma |
| 2009/0049555 A1 | 2/2009 | Cho |
| 2009/0089879 A1 | 4/2009 | Wang |
| 2009/0094311 A1 | 4/2009 | Awadallah |
| 2009/0132395 A1 | 5/2009 | Lam |
| 2009/0133106 A1 | 5/2009 | Bentley |
| 2009/0134972 A1 | 5/2009 | Wu, Jr. |
| 2009/0157792 A1 | 6/2009 | Fiatal |
| 2009/0172551 A1 | 7/2009 | Kane |
| 2009/0189736 A1 | 7/2009 | Hayashi |
| 2009/0199296 A1 | 8/2009 | Xie |
| 2009/0203355 A1 | 8/2009 | Clark |
| 2009/0227232 A1 | 9/2009 | Matas |
| 2009/0241188 A1 | 9/2009 | Komura |
| 2009/0254336 A1 | 10/2009 | Dumais |
| 2009/0281979 A1 | 11/2009 | Tysowski |
| 2009/0293119 A1 | 11/2009 | Jonsson |
| 2009/0300589 A1 | 12/2009 | Watters |
| 2009/0303204 A1 | 12/2009 | Nasiri |
| 2009/0320123 A1 | 12/2009 | Yu |
| 2010/0007632 A1 | 1/2010 | Yamazaki |
| 2010/0040293 A1 | 2/2010 | Hermann |
| 2010/0042387 A1 | 2/2010 | Gibbon |
| 2010/0042403 A1 | 2/2010 | Chandrasekar |
| 2010/0046806 A1 | 2/2010 | Baughman |
| 2010/0070405 A1 | 3/2010 | Joa |
| 2010/0077470 A1 | 3/2010 | Kozat |
| 2010/0082747 A1 | 4/2010 | Yue |
| 2010/0082998 A1 | 4/2010 | Kohavi |
| 2010/0097324 A1 | 4/2010 | Anson |
| 2010/0115610 A1 | 5/2010 | Tredoux |
| 2010/0122082 A1 | 5/2010 | Deng |
| 2010/0125816 A1 | 5/2010 | Bezos |
| 2010/0138370 A1 | 6/2010 | Wu |
| 2010/0164897 A1 | 7/2010 | Morin |
| 2010/0171753 A1 | 7/2010 | Kwon |
| 2010/0197352 A1 | 8/2010 | Runstedler |
| 2010/0225443 A1 | 9/2010 | Bayram |
| 2010/0245553 A1 | 9/2010 | Schuler |
| 2010/0269165 A1 | 10/2010 | Chen |
| 2010/0281539 A1 | 11/2010 | Burns |
| 2010/0284532 A1 | 11/2010 | Burnett |
| 2010/0287229 A1 | 11/2010 | Hauser |
| 2010/0321304 A1 | 12/2010 | Rofougaran |
| 2010/0328074 A1 | 12/2010 | Johnson |
| 2011/0010209 A1 | 1/2011 | McNally |
| 2011/0012829 A1 | 1/2011 | Yao |
| 2011/0016320 A1 | 1/2011 | Bergsten |
| 2011/0016534 A1 | 1/2011 | Jakobsson |
| 2011/0018828 A1 | 1/2011 | Wu |
| 2011/0023115 A1 | 1/2011 | Wright |
| 2011/0029902 A1 | 2/2011 | Bailey |
| 2011/0039529 A1 | 2/2011 | Kim |
| 2011/0039602 A1 | 2/2011 | McNamara |
| 2011/0043475 A1 | 2/2011 | Rigazio |
| 2011/0050394 A1 | 3/2011 | Zhang |
| 2011/0055077 A1 | 3/2011 | French |
| 2011/0063211 A1 | 3/2011 | Hoerl |
| 2011/0065504 A1 | 3/2011 | Dugan |
| 2011/0066682 A1 | 3/2011 | Aldunate |
| 2011/0102570 A1 | 5/2011 | Wilf |
| 2011/0105103 A1 | 5/2011 | Ullrich |
| 2011/0105859 A1 | 5/2011 | Popovic |
| 2011/0113388 A1 | 5/2011 | Eisen |
| 2011/0154273 A1 | 6/2011 | Aburada |
| 2011/0154497 A1 | 6/2011 | Bailey |
| 2011/0159650 A1 | 6/2011 | Shiraishi |
| 2011/0159850 A1 | 6/2011 | Faith |
| 2011/0162076 A1 | 6/2011 | Song |
| 2011/0191820 A1 | 8/2011 | Ivey |
| 2011/0193737 A1 | 8/2011 | Chiueh |
| 2011/0202453 A1 | 8/2011 | Issa |
| 2011/0221684 A1 | 9/2011 | Rydenhag |
| 2011/0223888 A1 | 9/2011 | Esaki |
| 2011/0225644 A1 | 9/2011 | Pullikottil |
| 2011/0246902 A1 | 10/2011 | Tsai |
| 2011/0248941 A1 | 10/2011 | Abdo |
| 2011/0251823 A1 | 10/2011 | Davis |
| 2011/0271342 A1 | 11/2011 | Chung |
| 2011/0276414 A1 | 11/2011 | Subbarao |
| 2011/0300831 A1 | 12/2011 | Chin |
| 2011/0304531 A1 | 12/2011 | Brooks |
| 2011/0320822 A1 | 12/2011 | Lind |
| 2012/0005483 A1 | 1/2012 | Patvarczki |
| 2012/0005719 A1 | 1/2012 | McDougal |
| 2012/0007821 A1 | 1/2012 | Zaliva |
| 2012/0054834 A1 | 3/2012 | King |
| 2012/0096555 A1 | 4/2012 | Mahaffey |

(56) References Cited

U.S. PATENT DOCUMENTS

| | | |
|---|---|---|
| 2012/0102551 A1 | 4/2012 | Bidare |
| 2012/0113061 A1 | 5/2012 | Ikeda |
| 2012/0123932 A1 | 5/2012 | LeCuyer |
| 2012/0124662 A1 | 5/2012 | Baca |
| 2012/0133055 A1 | 5/2012 | Machida |
| 2012/0151559 A1 | 6/2012 | Koudys |
| 2012/0154173 A1 | 6/2012 | Chang |
| 2012/0154273 A1 | 6/2012 | McDade |
| 2012/0154823 A1 | 6/2012 | Sakamoto |
| 2012/0158503 A1 | 6/2012 | Mardikar |
| 2012/0159599 A1 | 6/2012 | Szoke |
| 2012/0164978 A1 | 6/2012 | Conti |
| 2012/0167170 A1 | 6/2012 | Shi |
| 2012/0167204 A1 | 6/2012 | Akka |
| 2012/0174213 A1 | 7/2012 | Geiger |
| 2012/0188198 A1 | 7/2012 | Jeong |
| 2012/0204257 A1 | 8/2012 | O'Connell |
| 2012/0218193 A1 | 8/2012 | Weber |
| 2012/0239557 A1 | 9/2012 | Weinflash |
| 2012/0246737 A1 | 9/2012 | Paxton |
| 2012/0252410 A1 | 10/2012 | Williams |
| 2012/0278804 A1 | 11/2012 | Narayanasamy |
| 2012/0284380 A1 | 11/2012 | Anderson |
| 2012/0297476 A1 | 11/2012 | Zeljkovic |
| 2013/0018796 A1 | 1/2013 | Kolhatkar |
| 2013/0024239 A1 | 1/2013 | Baker |
| 2013/0036416 A1 | 2/2013 | Raju |
| 2013/0061169 A1 | 3/2013 | Pearcy |
| 2013/0076650 A1 | 3/2013 | Vik |
| 2013/0088434 A1 | 4/2013 | Masuda |
| 2013/0097682 A1 | 4/2013 | Zeljkovic |
| 2013/0097706 A1 | 4/2013 | Titonis |
| 2013/0109944 A1 | 5/2013 | Sparacino |
| 2013/0111586 A1 | 5/2013 | Jackson |
| 2013/0133055 A1 | 5/2013 | Ali |
| 2013/0135218 A1 | 5/2013 | Jain |
| 2013/0139248 A1 | 5/2013 | Rhee |
| 2013/0154999 A1 | 6/2013 | Guard |
| 2013/0162603 A1 | 6/2013 | Peng |
| 2013/0167212 A1 | 6/2013 | Azar |
| 2013/0198832 A1 | 8/2013 | Draluk |
| 2013/0212674 A1 | 8/2013 | Boger |
| 2013/0237272 A1 | 9/2013 | Prasad |
| 2013/0239195 A1 | 9/2013 | Turgeman |
| 2013/0239206 A1 | 9/2013 | Draluk |
| 2013/0243208 A1 | 9/2013 | Fawer |
| 2013/0254642 A1 | 9/2013 | Seo |
| 2013/0282637 A1 | 10/2013 | Costigan |
| 2013/0288647 A1 | 10/2013 | Turgeman |
| 2013/0305357 A1 | 11/2013 | Ayyagari |
| 2013/0312097 A1 | 11/2013 | Turnbull |
| 2013/0335349 A1 | 12/2013 | Ferren |
| 2013/0346309 A1 | 12/2013 | Giori |
| 2014/0033317 A1 | 1/2014 | Barber |
| 2014/0041020 A1 | 2/2014 | Zhao |
| 2014/0078061 A1 | 3/2014 | Simons |
| 2014/0078193 A1 | 3/2014 | Barnhoefer |
| 2014/0082369 A1 | 3/2014 | Waclawsky |
| 2014/0111451 A1 | 4/2014 | Park |
| 2014/0114843 A1 | 4/2014 | Klein |
| 2014/0118520 A1 | 5/2014 | Slaby |
| 2014/0123275 A1 | 5/2014 | Azar |
| 2014/0143304 A1 | 5/2014 | Hegarty |
| 2014/0168093 A1 | 6/2014 | Lawrence |
| 2014/0196119 A1 | 7/2014 | Hill |
| 2014/0200953 A1 | 7/2014 | Mun |
| 2014/0223531 A1 | 8/2014 | Outwater |
| 2014/0244499 A1 | 8/2014 | Gruner |
| 2014/0250538 A1 | 9/2014 | Rapaport |
| 2014/0259130 A1 | 9/2014 | Li |
| 2014/0270571 A1 | 9/2014 | Dwan |
| 2014/0283059 A1 | 9/2014 | Sambamurthy |
| 2014/0283068 A1 | 9/2014 | Call |
| 2014/0289833 A1 | 9/2014 | Briceno |
| 2014/0317028 A1 | 10/2014 | Turgeman |
| 2014/0317726 A1 | 10/2014 | Turgeman |
| 2014/0317734 A1 | 10/2014 | Valencia |
| 2014/0317744 A1 | 10/2014 | Turgeman |
| 2014/0325223 A1 | 10/2014 | Turgeman |
| 2014/0325645 A1 | 10/2014 | Turgeman |
| 2014/0325646 A1 | 10/2014 | Turgeman |
| 2014/0325682 A1 | 10/2014 | Turgeman |
| 2014/0337786 A1 | 11/2014 | Luo |
| 2014/0344927 A1 | 11/2014 | Turgeman |
| 2015/0002479 A1 | 1/2015 | Kawamura |
| 2015/0012920 A1 | 1/2015 | De Santis |
| 2015/0062078 A1 | 3/2015 | Christman |
| 2015/0081549 A1 | 3/2015 | Kimberg |
| 2015/0091858 A1 | 4/2015 | Rosenberg |
| 2015/0094030 A1 | 4/2015 | Turgeman |
| 2015/0101031 A1 | 4/2015 | Harjanto |
| 2015/0128252 A1 | 5/2015 | Konami |
| 2015/0146945 A1 | 5/2015 | Han |
| 2015/0205944 A1 | 7/2015 | Turgeman |
| 2015/0205955 A1 | 7/2015 | Turgeman |
| 2015/0205957 A1 | 7/2015 | Turgeman |
| 2015/0205958 A1 | 7/2015 | Turgeman |
| 2015/0212843 A1 | 7/2015 | Turgeman |
| 2015/0213244 A1 | 7/2015 | Lymberopoulos |
| 2015/0213245 A1 | 7/2015 | Tartz |
| 2015/0213246 A1 | 7/2015 | Turgeman |
| 2015/0213251 A1 | 7/2015 | Turgeman |
| 2015/0242601 A1 | 8/2015 | Griffiths |
| 2015/0256528 A1 | 9/2015 | Turgeman |
| 2015/0256556 A1 | 9/2015 | Kaminsky |
| 2015/0264572 A1 | 9/2015 | Turgeman |
| 2015/0268768 A1 | 9/2015 | Woodhull |
| 2015/0279155 A1 | 10/2015 | Chun |
| 2015/0310196 A1 | 10/2015 | Turgeman |
| 2015/0348038 A1 | 12/2015 | Femrite |
| 2015/0358317 A1 | 12/2015 | Deutschmann |
| 2016/0006800 A1 | 1/2016 | Summers |
| 2016/0012465 A1 | 1/2016 | Sharp |
| 2016/0034673 A1 | 2/2016 | Chandra |
| 2016/0042164 A1 | 2/2016 | Goldsmith |
| 2016/0048937 A1 | 2/2016 | Mathura |
| 2016/0055324 A1 | 2/2016 | Agarwal |
| 2016/0057623 A1 | 2/2016 | Dutt |
| 2016/0077620 A1 | 3/2016 | Choi |
| 2016/0087952 A1 | 3/2016 | Tartz |
| 2016/0109969 A1 | 4/2016 | Keating |
| 2016/0132105 A1 | 5/2016 | Turgeman |
| 2016/0155126 A1 | 6/2016 | D'Uva |
| 2016/0164905 A1 | 6/2016 | Pinney Wood |
| 2016/0164906 A1 | 6/2016 | Pinney Wood |
| 2016/0174044 A1 | 6/2016 | Jones |
| 2016/0179245 A1 | 6/2016 | Johansson |
| 2016/0182503 A1 | 6/2016 | Cheng |
| 2016/0191237 A1 | 6/2016 | Roth |
| 2016/0196414 A1 | 7/2016 | Stuntebeck |
| 2016/0197918 A1 | 7/2016 | Turgeman |
| 2016/0209948 A1 | 7/2016 | Tulbert |
| 2016/0226865 A1 | 8/2016 | Chen |
| 2016/0241555 A1 | 8/2016 | Vo |
| 2016/0294837 A1 | 10/2016 | Turgeman |
| 2016/0300049 A1* | 10/2016 | Guedalia ............... G06F 21/316 |
| 2016/0300054 A1 | 10/2016 | Turgeman |
| 2016/0306974 A1 | 10/2016 | Turgeman |
| 2016/0307191 A1 | 10/2016 | Turgeman |
| 2016/0307201 A1 | 10/2016 | Turgeman |
| 2016/0321445 A1 | 11/2016 | Turgeman |
| 2016/0321689 A1 | 11/2016 | Turgeman |
| 2016/0328572 A1 | 11/2016 | Valacich |
| 2016/0342826 A1 | 11/2016 | Apostolos |
| 2016/0344783 A1 | 11/2016 | Kushimoto |
| 2016/0364138 A1 | 12/2016 | Luo |
| 2016/0366177 A1 | 12/2016 | Turgeman |
| 2016/0371476 A1 | 12/2016 | Turgeman |
| 2017/0011217 A1 | 1/2017 | Turgeman |
| 2017/0012988 A1 | 1/2017 | Turgeman |
| 2017/0017781 A1 | 1/2017 | Turgeman |
| 2017/0032114 A1 | 2/2017 | Turgeman |
| 2017/0034210 A1 | 2/2017 | Talmor |
| 2017/0048272 A1 | 2/2017 | Yamamura |

(56) References Cited

U.S. PATENT DOCUMENTS

| | | |
|---|---|---|
| 2017/0054702 A1 | 2/2017 | Turgeman |
| 2017/0063858 A1 | 3/2017 | Bandi |
| 2017/0076089 A1 | 3/2017 | Turgeman |
| 2017/0085587 A1 | 3/2017 | Turgeman |
| 2017/0090418 A1 | 3/2017 | Tsang |
| 2017/0091450 A1 | 3/2017 | Turgeman |
| 2017/0126735 A1 | 5/2017 | Turgeman |
| 2017/0127197 A1 | 5/2017 | Mulder |
| 2017/0140279 A1 | 5/2017 | Turgeman |
| 2017/0149958 A1 | 5/2017 | Xian |
| 2017/0154366 A1 | 6/2017 | Turgeman |
| 2017/0177999 A1 | 6/2017 | Novik |
| 2017/0193526 A1 | 7/2017 | Turgeman |
| 2017/0195354 A1 | 7/2017 | Kesin |
| 2017/0195356 A1 | 7/2017 | Turgeman |
| 2017/0221064 A1 | 8/2017 | Turgeman |
| 2017/0302340 A1 | 10/2017 | Berlin |
| 2017/0364674 A1 | 12/2017 | Grubbs |
| 2017/0364919 A1 | 12/2017 | Ranganath |
| 2018/0012003 A1 | 1/2018 | Asulin |
| 2018/0012227 A1 | 1/2018 | Tunnell |
| 2018/0034850 A1 | 2/2018 | Turgeman |
| 2018/0095596 A1 | 4/2018 | Turgeman |
| 2018/0103047 A1 | 4/2018 | Turgeman |
| 2018/0107836 A1 | 4/2018 | Boger |
| 2018/0115899 A1 | 4/2018 | Kedem |
| 2018/0121640 A1 | 5/2018 | Turgeman |
| 2018/0160309 A1 | 6/2018 | Turgeman |
| 2018/0314816 A1 | 11/2018 | Turgeman |
| 2018/0349583 A1 | 12/2018 | Turgeman |
| 2018/0350144 A1 | 12/2018 | Rathod |
| 2018/0351959 A1 | 12/2018 | Turgeman |
| 2018/0373780 A1 | 12/2018 | Pascarella |
| 2019/0028497 A1 | 1/2019 | Karabchevsky |
| 2019/0057200 A1 | 2/2019 | Sabag |
| 2019/0121956 A1 | 4/2019 | Turgeman |
| 2019/0156034 A1 | 5/2019 | Kedem |
| 2019/0158535 A1 | 5/2019 | Kedem |
| 2019/0220863 A1 | 7/2019 | Novick |
| 2019/0236391 A1 | 8/2019 | Novik |
| 2019/0272025 A1 | 9/2019 | Turgeman |
| 2019/0342328 A1 | 11/2019 | Rivner |
| 2019/0342329 A1 | 11/2019 | Turgeman |
| 2020/0012770 A1 | 1/2020 | Turgeman |
| 2020/0045044 A1 | 2/2020 | Turgeman |
| 2020/0076816 A1 | 3/2020 | Turgeman |

FOREIGN PATENT DOCUMENTS

| | | | |
|---|---|---|---|
| EP | 2541452 | A1 | 1/2013 |
| EP | 2610776 | A2 | 7/2013 |
| EP | 2646904 | B1 | 8/2018 |
| EP | 3019991 | B1 | 2/2019 |
| ES | 2338092 | A1 | 5/2010 |
| JP | 2006277341 | A | 10/2006 |
| WO | 2005099166 | A2 | 10/2005 |
| WO | 2007146437 | A2 | 12/2007 |
| WO | 2012/001697 | A1 | 1/2012 |
| WO | 2012073233 | A1 | 6/2012 |
| WO | 2013/161077 | A1 | 10/2013 |
| WO | 2018/007821 | A1 | 1/2018 |
| WO | 2018/007823 | A1 | 1/2018 |
| WO | 2018/055406 | A1 | 3/2018 |

OTHER PUBLICATIONS

Faisal Alkhateeb et al., "Bank Web Sites Phishing Detection and Notification System Based on Semantic Web technologies", International Journal of Security and its Applications 6(4):53-66, Oct. 2012.

Sungzoon Cho et al., "Artificial Rhythms and Cues for Keystroke Dynamics Based Authentication", International Conference on Biometrics (ICB)—Advances in Biometrics, pp. 626-632, year 2006.

International Search Report for PCT/IB2017/055995, dated Feb. 15, 2018.

Written Opinion of the International Search Authority for PCT/IB2017/055995, dated Feb. 15, 2018.

Supplementary European Search Report for application 11844440 dated Nov. 17, 2017.

International Search Report for application PCT/IB2016/054064 dated Nov. 21, 2016.

International Search Report for application PCT/IB2014/062941 dated Dec. 17, 2014.

International Search Report for application PCT/IB2014/062293 dated Oct. 1, 2014.

International Search Report for application PCT/IL2011/000907 dated Apr. 19, 2012.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

Nance et al., "Virtual Machine Introspection", IEEE Security & Privacy, 2008.

Garfinkel and Rosenblum, "A virtual Machine Introspection-Based Architecture for Intrusion Detection.", 2003, Proc. Network and Distributed Systems Security Symp., The Internet Society, pp. 191-206.

Spafford et al., "Software Forensics: Can We Track Code to its Authors?", Feb. 1992, Computer Science Technical Report, Purdue e-Pubs, Report No. CSD-TR-92-010.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Zheng et al., "An Efficient User Verification System via Mouse Movements", Oct. 17-21, 2011, CCS' 11, Chicago, Illinois.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Georgia Frantzeskou et al., "Identifying Authorship by Byte-Level N-Grams: The source Code Author Profile (SCAP) Method", Spring 2007, International Journal of Digital Evidence, vol. 6, issue 1.

Franklin et al., "Remote Detection of Virtual Machine Monitors with Fuzzy benchmarking", ACM SIGOPS Operating Systems Review, V42, Issue 3, Apr. 2008.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

Communication from the European Patent Office (EPO) in EP 14814408, dated Oct. 15, 2019.

Ahmed et al., "A New Biometric Technology Based on Mouse Dynamics", Jul.-Sep. 2007, IEEE Transactions on Dependable and Secure Computing, vol. 4, No. 3, pp. 165-179.

Bailey, Kyle O., "Computer Based Behavioral Biometric Authentication Via Multi-Modal Fusion", Thesis, 2013, Air Force Insitute of Technology.

Elizabeth Stinson and John C. Mitchell, "Characterizing the Remote Control Behavior of Bots", Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

(56) References Cited

OTHER PUBLICATIONS

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Ben Hansen, "The Blur Busters Mouse Guide", dated Feb. 1, 2014; printed from the Internet on Aug. 5, 2019 from: https://www.blurbusters.com/faq/mouse-guide/.

Chris Cain, "Analyzing Man-in-the-Browser (MITB) Attacks", dated Dec. 2014; downloaded from the Internet on Aug. 5, 2019 from: https://www.sans.org/reading-room/whitepapers/forensics/analyzing-man-in-the-browser-mitb-attacks-35687.

International Search Report for PCT international application PCT/IL2018/051246, dated Mar. 11, 2019.

Written Opinion of the International Searching Authority for PCT international application PCT/IL2018/051246, dated Mar. 11, 2019.

Written Opinion of the International Searching Authority for PCT international application PCT/IL2011/000907, dated Apr. 19, 2012.

Written Opinion of the International Searching Authority for PCT international application PCT/IB2014/062293, dated Oct. 1, 2014.

Written Opinion of the International Searching Authority for PCT international application PCT/IB2014/062941, dated Dec. 17, 2014.

Written Opinion of the International Searching Authority for PCT international application PCT/IB2016/054064, dated Jul. 9, 2015.

Syed Ahsan Abbas et al., "What is the difference between a rooted and unrooted Android?" Quora.com, dated Jul. 22, 2016, printed on Aug. 12, 2019 from: www.Quora.com/What-is-the-difference-between-a-rooted-and-unrooted-Android.

Sebastian Lindstrom, "Getting to know asynchronous JavaScript: Callbacks, Promises and Async / Await", Medium.com, dated Jul. 2, 2017, printed on Aug. 12, 2019 from: Medium.com/codebuddies/getting-to-know-asynchronous-javascript-callbacks-promises-and-async-await-17e0673281ee.

Machine translation of WO 2013/161077 A1, "Biometric authentication device, biometric authentication program, and biometric authentication method", Obtained on Jan. 24, 2020 from: https://patents.google.com/patent/WO2013161077A1/en?oq=JP2006277341A.

Oriana Riva et al., "Progressive authentication: Deciding when to authenticate on mobile phones", USENIX Security Symposium 2012.

\* cited by examiner

CONDITIONAL BEHAVIORAL BIOMETRICS

CROSS-REFERENCE TO RELATED APPLICATIONS

This patent application claims priority to Great Britain Patent Application GB 1511230.3, filed Jun. 25, 2015, entitled "Conditional Behavioural Biometrics," which is incorporated herein by reference in its entirety.

FIELD OF THE INVENTION

The present invention relates to an improved method of providing identification of a user or authentication of a user's identity. More particularly, the present invention relates to an improved method of providing identification of a user or authentication of a user's identity using conditional behavioural biometrics.

BACKGROUND

For the purposes of this specification, identification typically involves the collection of data and a determination of who a user is from a database of users while authentication typically involves the use of data to confirm a user is who they present themselves to be (i.e. to verify a user's identity).

Identification and/or authentication of a user identity is an essential step in accessing many secure services or devices, such as banking, stored personal details or other restricted data. This identification and/or authentication is usually achieved by the use of passwords or personal identification numbers (PINs), which are usually assumed to be known only by the authorised user or users of a service or device.

However, knowledge of a user's password or PIN is enough for an unauthorised third party to gain access to the service or device. Additional layers of security or improved security are therefore required to reduce the risk of passwords and PINs from being used by unauthorised third parties.

Adding further security measures to the authentication process usually requires a trade-off between the increased level of security and the degradation of the user experience.

SUMMARY OF THE INVENTION

The present invention seeks to provide an enhanced method of authenticating and/or identifying a user identity using conditional behavioural biometrics.

According to a first aspect of the present invention, there is provided a method of generating a user profile for use in identifying and/or authenticating a user on a device, the device equipped with one or more sensors, the method comprising: generating a set of data points from sensory data collected by the one or more sensors; clustering the set of data points to produce a set of data clusters; developing a first classifier for the data clusters, the first classifier being operable to assign a further data point derived from a further user interaction with the computing device to one of the data clusters; and developing one or more further classifiers for at least one of the data clusters, the further classifier operable to identify and/or authenticate a user identity based on the further data point.

According to a second aspect of the invention, there is provided a method of identifying and/or authenticating a user on a device, the device equipped with one or more sensors, the method comprising: generating a data point from sensory data derived from a user interaction with the device; assigning the data point to a cluster of data points using a first classifier, the first classifier developed from a plurality of previous user interactions with the device; and applying a second classifier to the data point, the second classifier being chosen based on the assigned data cluster, and operable to identify and/or authenticate a user identity based on the further data point.

By classifying sensory data based on previous user interactions with a computing device, an additional layer of security can be provided over solely using a password or PIN input for security as a device can identify and/or authenticate a user separately to the user providing credentials to identify or authenticate themselves (or identify then authenticate themselves). The classifier is developed from a plurality of previous user interactions with the computing device. Using conditional behavioural biometrics can remove the trade-off between security versus any degradation of the user experience necessary when using PINs or passwords to authenticate a user. Optionally, the classifier can be based on biometric and/or behavioural data collected, further optionally where the classifier can be based on biometric and/or behavioural data collected during a user interaction with the device. By clustering user data while generating a user profile, different user contexts can be identified and a separate identification and/or authentication classifier can be trained for each one. Having context specific classifiers for identification and/or authentication can allow for a higher accuracy of identification and/or authentication in comparison with using a single classifier for every situation, since a user will in general interact with a computing device differently depending on the context. Herein, sensory data is used to connote data from or derived from the sensors—i.e. sensor data. A classifier is taken to connote any algorithm for statistical classification of a data set.

Optionally, the sensory data is collected during a plurality of user interactions with the device.

By using the data collected during multiple user interactions with the device to develop the user profile a more accurate set of classifiers may be obtained.

Optionally, an algorithm is used to perform the clustering of the data points derived from the sensory data.

Optionally, the algorithm is one or more clustering algorithms based on one of a K-means algorithm or a Gaussian Mixture Model using an Expectation-Maximisation algorithm.

K-means algorithms and Gaussian Mixture Models can be used to efficiently cluster the user data during the generation of a user profile.

Optionally, the identification and/or authentication of the user further comprises the step of identifying and/or authenticating the user identity using the further classifiers.

Using the classifiers to identify and/or authenticate the user identity can remove the need for the user to manually enter identification and/or authentication data, enhancing the user experience.

Optionally, the output of the second classifier is a confidence score in the user identity and/or authentication.

Optionally, if the confidence score is below a pre-defined threshold, further identification and/or authentication steps are carried out or the user is not identified and/or authenticated.

By providing a confidence score and using it to determine if further identification and/or authentication steps are required, the error rate associated with false negatives can be reduced.

Optionally, the computing device comprises at least one of: a mobile device; a local server; a cloud or network based server; and a desktop computer.

The profile generation and identification/authentication methods can be performed locally on the user device, remotely on a server or on a combination of the two. This allows for greater flexibility in the implementation of the method.

BRIEF DESCRIPTION OF THE DRAWINGS

Embodiments of the present invention will now be described, by way of example only and with reference to the accompanying drawings having like-reference numerals, in which.

SPECIFIC DESCRIPTION

Figure 1:
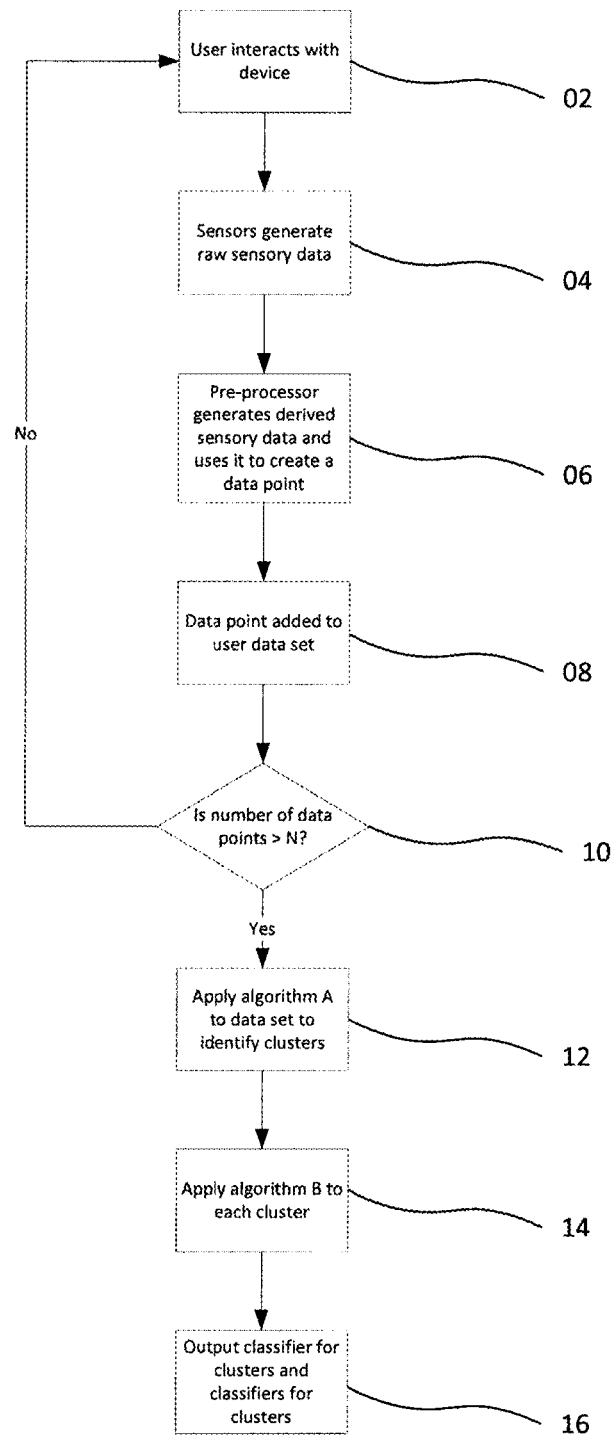
FIG. 1 is a flow chart illustrating the enrolment stage of the method according to an embodiment.
Figure 2:
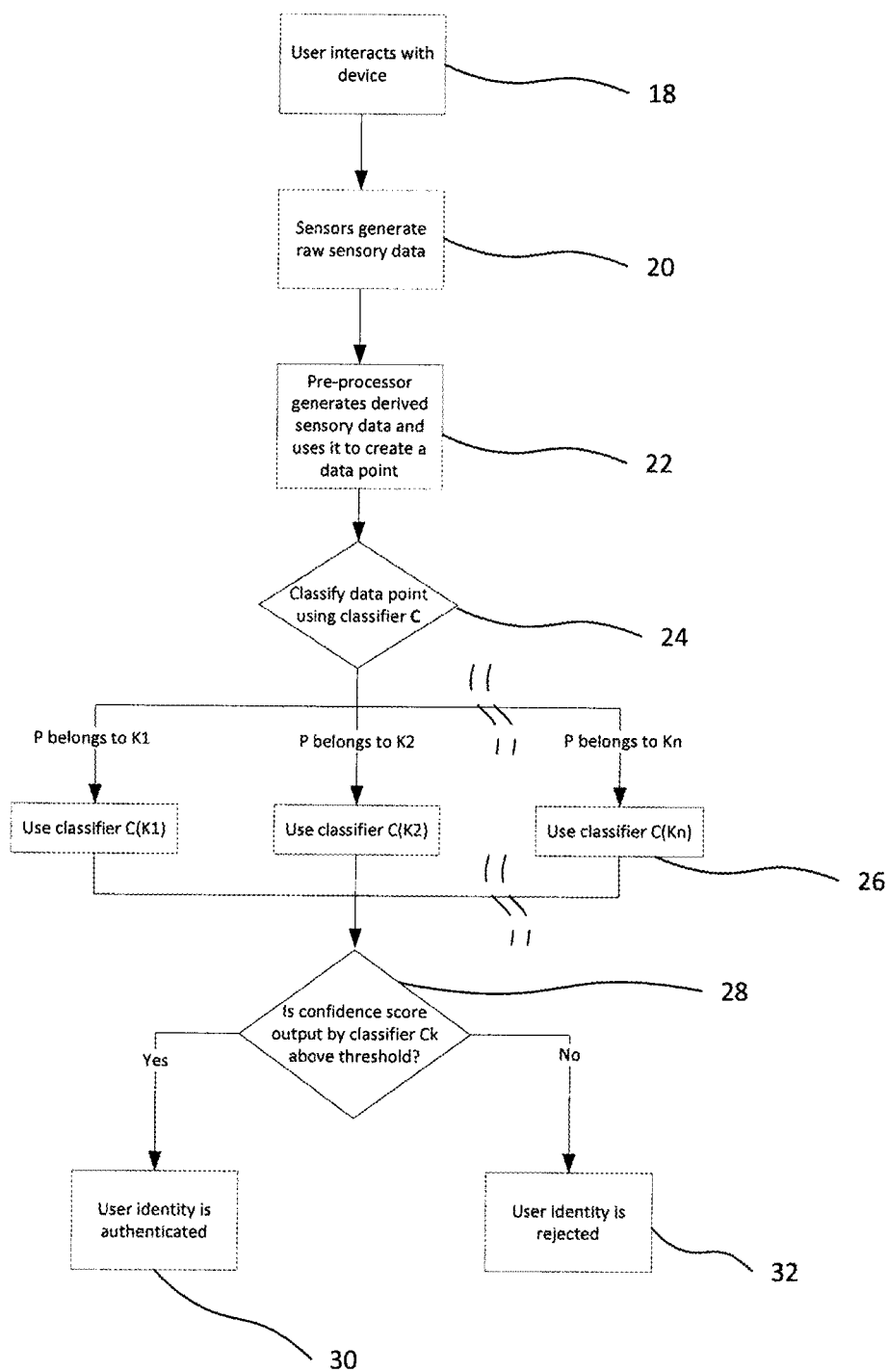
FIG. 2 is a flow chart illustrating the authentication stage of the method according to an embodiment.

Referring to FIGS. 1 and 2, an exemplary embodiment of the method will now be described.

The method relates to providing enhanced identification and/or authentication of the identity of a user on a computing device, by using the user's behaviour while interacting with the device. The method is principally divided into two steps: (a) generating a user profile (herein referred to as the "enrolment stage") based on data collected by the device, optionally only while a user is interacting with the device and further optionally when the user is inputting passwords, PINs or any identity of security data; and (b) the authentication stage, wherein the user profile generated in the enrolment stage is used to authenticate a user identity based on behavioural data collected while inputting a password, PIN or any identity or security data.

Referring to FIG. 1, the enrolment stage of the method will now be described according to an embodiment of the method.

The object of the enrolment stage of the method is to generate a user profile from data generated during a user's interactions with a computing device. The user profile comprises a set of K data clusters corresponding to different contexts to the user activity, a classifier C for assigning new data points to clusters, and a further classifier Ck associated with each cluster for determining whether a user is authentic or not from sensory data collected while the user is entering their details.

The user activity contexts include, but are not limited to, the user location, the user activity (for example the user's movement speed or whether the user is listening to music), the computing device's connections or the device orientation (for example, if the computing device is a mobile device, whether it is the portrait or landscape orientation).

The use of different classifiers for authenticating the user, taking into account the context, allows for a higher degree of accuracy in authenticating the user identity than the use of a single classifier for all situations. For example, a user interacting with a device held in their hand while walking will interact with the device differently to a device on a table in front of them while sitting. The orientation of the device (i.e. whether it is in portrait or landscape modes) may also affect how the user interacts with the device.

During use, a user can interact with a computing device to input, for example, a password or PIN for accessing a secure service or the device. The computing device may be, for example, a personal computer (such as a desktop or laptop computer), mobile computing device (such as a mobile telephone or tablet) or a fixed terminal (such as an ATM or touchscreen kiosk). The computing device is equipped with one or more sensors for measuring certain properties of the user's interaction with the device, and/or environmental properties during the interaction and/or in the background during normal use of the device. The data derived directly from the device sensors will herein be referred to as raw sensory data.

For example, if interacting with a touchscreen device, the touch time, touch timing, touch pressure, touch area and touch location coordinates can be detected and recorded. Other non-limiting examples of raw sensory data include accelerometer data, gyroscopic data, GPS co-ordinates and hover co-ordinates.

Raw sensory data need not only be collected when the user is consciously interacting with the device. For example, if the device is a mobile device, then raw sensory data may be collected while the device is in the user's pocket to provide information about, for example, the user's walking style or how they sit or stand. As raw sensory data can be collected continuously by the device (whether during operation by the user or not), the monitoring of the user's sensory data is continuous and invisible to user, thus the verification of the identity of the user can similarly be continuous and invisible to the user. In contrast, the use of a PIN or fingerprints can only verify identity at a point in time.

The raw sensory data associated with the user's interaction with the device is then passed to a pre-processor (or processor), where it is converted into derived sensory data. Derived sensory data comprises a set of features that can be calculated or derived from the raw sensory data, but which features may not be determined directly by the device's sensors. Non-sensory data derived from other sources (such as the internet) may also be combined with the raw sensory data to generate derived sensory data or used as raw sensory data, depending on the implementation details of the method.

Features derived from raw sensory data can include: a duration of touchscreen interaction; a physical touchscreen interaction distance; a time between touchscreen interactions; maximum, minimum and/or average deviation from a straight line during a touchscreen interaction; acceleration and/or deceleration of a touchscreen interaction; curvature of a touchscreen interaction; length of a touchscreen interaction (all derived from touchscreen associated data); background tremor while using the device; tremor during the interaction with the device (both derived from accelerometer and gyroscope data); device (and therefore user) movement speed (derived from device GPS coordinates and/or other device location service or services); and the orientation of the computing device (derived from magnetometer data). Many other example features are possible to derive from the raw sensory data.

This derived sensory data, along with any usable raw sensory data, is used to generate a data point associated with that particular user interaction. The data point is then added to a user data set, comprising all the data points associated with a given user. If the total number of data points in the set after the new point has been added is fewer than a predetermined number, N, then the process is repeated for further user interactions until the predetermined number of data points has been reached. This data set will form a training set of data for training classifiers for use in authenticating the user identity. It can be stored locally on the user's device and/or in a back end server associated with the provider of the secure service.

The data point comprises a subset of all the raw and derived sensory data. For example, it may include x and y touch coordinates, pressure, typing speed, touch durations and geolocation. Many other examples are possible.

Once the size of the data set has reached a predefined number of data points, a clustering or classification algorithm (herein referred to as algorithm A) is applied to the user data set. The predefined number of data points can be predetermined to be statistically significant or sufficient to allow the classification algorithm to be able to substantially reliably identify the user, or can be chosen adaptively using machine learning techniques. Algorithm A takes the user data set as an input and produces a model of a set of K clusters or classes corresponding to different user behaviours based on a subset of the user data. The subset of data used is predetermined, but alternatively may again be chosen adaptively using machine learning techniques. The optimal number of classes can be chosen using cross validation.

An example of the type of algorithm used as Algorithm A is a K-means clustering algorithm. In this example, initially a set of K random "mean" points is generated. Each of the data points in the data set are assigned to the nearest one of these mean points, based on a metric (for example the Euclidean distance), to form a set of K clusters. A new mean point for each of these clusters is then calculated. The points in the data set are then reassigned to the nearest of these new means to form K new clusters. These two steps are repeated until convergence (in the sense that the clusters no longer change or substantially change between iterations) is achieved. Many other examples are possible, such as Gaussian Mixture Models using an Expectation-Maximisation algorithm.

The clusters identified in this way should correspond to different user activity contexts.

Algorithm A also uses the user data set to develop a classifier C, which can be used to identify further data points as associated with one of the K clusters. This classifier may, for example, be based on a K-nearest neighbour classification, details of which will be outlined below.

Once the data clusters corresponding to different user environments or behaviours have been determined by algorithm A, a second classification algorithm (herein referred to as algorithm B) is applied to the data points within each cluster Ki. Algorithm B trains a separate classifier Ci for each of the K clusters, which distinguishes between a legitimate user and an illegitimate one (an "attacker"). Algorithm B is based on a Random Forest decision-learning tree, but other examples are possible.

It should be noted that algorithm B could be a set of algorithms, for each of the different K clusters.

The output of the enrolment stage is therefore multiple classifiers, or a classifier and a classifier set: a first classifier C for assigning new data points to one of the K clusters identified by algorithm A; and a set of further classifiers {Ci}, each of which is associated with one of the data clusters and is operable to provide authentication of a new data point.

The first classifier and the second classifier set, along with the derived sensory data used to train them, may be stored on the user's computing device, or alternatively on a remote server or group of servers (e.g. a cloud service or cloud) that could, for example, be under the control of the secure service provider. Likewise, the identification of the K clusters and the training of the classifiers can take place either on the user's computing device, or remotely (e.g. within the cloud).

Referring now to FIG. 2, the authentication stage of the method will now be described according to an embodiment of the method.

In the authentication stage of the method, a user interacts with the computing device, generating a data point from sensory data, which is used to authenticate the user's identity.

The authentication stage begins with the user interacting with the computing device while entering authentication data, such as a password or PIN. As the authentication data is entered, raw sensory data, as described above, is generated by sensors associated with the computing device. A pre-processor (or processor) then converts this raw sensory data to derived sensory data, as described above, and generates a data point from it. In this regard, the first steps of the authentication stage are substantially identical to those of the enrolment stage.

Upon generation of the data point, the classifier C (generated by algorithm A in the enrolment stage) is applied to it. This determines which of the K clusters, identified by algorithm A, the data point should be associated with, i.e. which user situation and/or behaviour is the most appropriate to use given the sensory inputs. This can be, for example, achieved by the use of a K-nearest neighbour algorithm, which works by determining the class of the K (not to be confused with the number of clusters) nearest points in the dataset, based on a distance metric (for example the Euclidean distance), and assigning the data point to a cluster based on which cluster contains the largest number of nearest points. It will be appreciated that alternatives to a K-nearest neighbour approach may be used.

Once the first classifier has identified the appropriate cluster, Ki, the corresponding second classifier, Ci, developed by algorithm B in the enrolment stage and associated with the identified cluster, is applied to the data point. This second stage classifier is based on a random forest algorithm, in which the data point is passed through the ensemble of decision trees trained during the enrolment stage. The output of each of these trees is either a pass or a fail. The ratio of the number of passes to the number of fails is used to determine a confidence score that the user identity is correct. The classifier may alternatively be based on a number of other algorithms, including, but not limited to: neural networks; k-nearest neighbours; and naïve Bayes.

The output of the second classifier is a confidence score for the user being an approved user. If this score is above a pre-determined threshold, the user is authenticated as a legitimate, authorised user. The threshold is variable depending on the requirements of the service being accessed by the user, and can be set to prioritise minimising false-positives or false negatives. It adjusts automatically based on the data used to train the classifiers in order to achieve the desired error rates.

The confidence score is output along with the pass/fail authentication result.

If the confidence score does exceed the required threshold, the user may be asked to input more security or authentication data—for example, answering security questions or inputting passwords or PINs.

In an alternative embodiment, the user's interaction with the device is used as described above to authenticate the user identity, without the user being required to input any security data. The user sensory data is collected and monitored in the background on the device and, when a user would normally be required to login to a service to perform authentication, as long as the behavioural biometrics continues to classify the user as the authorised user the user will not be required to provide any password, PIN or fingerprint (for example during an online check out process when purchasing goods or services over the Internet) as any authentication is performed in the background. Should the behavioural biometrics fail to continue to classify the user as the authorised user, the user will be asked to enter further security information.

A user may interact with a secure service through multiple different devices or types of device. When this is the case, the total user data sets associated with the user will be partitioned into subsets based on the device identity before algorithm A is applied. Enrolment is essentially performed for each device type individually.

The computations associated with the enrolment and authentication stages (i.e. the application of algorithms A and B in enrolment and of the classifiers in authentication) can be performed either on the user computing device itself, or on a server or servers associated with the provider of the secure service, or in combination between the device and server or servers.

There are four examples presented here:

In the first example, all computation is performed on the server. The raw and/or derived sensory data derived from the computing device's sensors is transmitted to the server across a network, where the algorithms or classifiers are applied to it. The classifiers trained in the enrolment stage are stored on the server.

In the second example, all the computations are performed on the user device. The classifiers are stored locally on the user computing device. An authentication message is sent to the server upon the computing device authenticating the user identity, allowing the user access to the secure service.

The third example splits the computation between the server and the computer. The enrolment stage computations are performed on the server to train the classifiers. These are then transmitted to the user computing device and stored locally. The user computing device applies the classifiers to the user data point being used for authentication and transmits a message to the server indicating success or failure. This combination is advantageous in the cases when the user computing device has limited processing power, or when the data set is very large.

The fourth example performs the enrolment stage calculations on the user computing device and then transmits the trained classifiers to the server. The authentication stage calculations are then performed by the server when it receives sensory data (or a data point) transmitted to it across a network by the computing device.

If the user is authenticated then the newly authenticated data point can be added to the set data points for use in a future enrolment stage update. Every time a pre-defined number of new data points, M, are added to the data set the model generated by the enrolment stage is updated. This can be done continuously by using the current models as a starting point, or the models can be regenerated completely.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention claimed is:

1. A method comprising:
   (a) monitoring touch-screen gestures of a user, that interacts with an online service via a touch-screen of a computing device, across multiple usage sessions;
   (b) monitoring acceleration and tilt of said computing device, during said touch-screen gestures;
   (c) extracting data-points from the monitoring performed in step (a) and from the monitoring performed in step (b);
   (d) performing classification of said data-points, and generating a user-specific profile that indicates a characterizing acceleration and a characterizing tilt of the computing device during said touch-screen gestures;
   (e) subsequently, monitoring touch-screen gestures that are performed via the touch-screen of the computing device during access to said online service; and monitoring accompanying acceleration and tilt of said computing device;
   (f) extracting data-points from information monitored in step (e);
   (g) analyzing the data-points extracted in step (f), and checking whether said data-points match said user-specific profile generated in step (d);
   (h) if the checking of step (g) has a negative result, then: generating a notification that a user that interacted in step (e) with the computing device to access said online service, is different from the user that interacted in step (a) with the computing device to access said online service;
   wherein the generating of step (h) is further based on: determining that a first characteristic of landscape/portrait device orientation during touch-screen gestures monitored on the computing device in step (a), is different from a second characteristic of landscape/portrait device orientation during touch-screen gestures monitored on the computing device in step (e).

2. The method of claim 1,
   wherein the computing device is a device selected from the group consisting of:
   a laptop computer, a personal computer, a desktop computer, a mobile computing device, a mobile telephone, a tablet.

3. The method of claim 1, comprising:
   utilizing user interactions with the computing device to authenticate the user identity without requiring the user to input any security data, by collecting and monitoring sensory data in the background on the computing device.

4. The method of claim 1, comprising:
   utilizing user interactions with the computing device to authenticate the user identity without requiring the user to input any security data, by collecting and monitoring sensory data in the background on the computing device;
   wherein, if behavioral biometrics continue to classify the user as an authorized user, then the method does not require the user to provide any password or PIN or fingerprint and the method comprises performing user authentication in the background;

wherein, if said behavioral biometrics fail to continue to classify the user as the authorized user, then the method comprises asking the user to enter further security information.

5. A method comprising:
(a) monitoring touch-screen gestures of a user, that interacts with an online service via a touch-screen of a computing device, across multiple usage sessions;
(b) monitoring acceleration and tilt of said computing device, during said touch-screen gestures;
(c) extracting data-points from the monitoring performed in step (a) and from the monitoring performed in step (b);
(d) performing classification of said data-points, and generating a user-specific profile that indicates a characterizing acceleration and a characterizing tilt of the computing device during said touch-screen gestures;
(e) subsequently, monitoring touch-screen gestures that are performed via the touch-screen of the computing device during access to said online service; and monitoring accompanying acceleration and tilt of said computing device;
(f) extracting data-points from information monitored in step (e);
(g) analyzing the data-points extracted in step (f), and checking whether said data-points match said user-specific profile generated in step (d);
(h) if the checking of step (g) has a negative result, then: generating a notification that a user that interacted in step (e) with the computing device to access said online service, is different from the user that interacted in step (a) with the computing device to access said online service;
wherein generating said user-specific profile comprises:
generating a user-specific profile that is based on at least:
(i) a characteristic of background tremor of the computing device during monitored touch-screen gestures, and
(ii) a characteristic of curvature of monitored touch-screen gestures, and
(iii) a characteristic of landscape/portrait device orientation during monitored touch-screen gestures.

6. The method of claim 5,
wherein the computing device is a device selected from the group consisting of:
a laptop computer, a personal computer, a desktop computer, a mobile computing device, a mobile telephone, a tablet.

7. The method of claim 5, comprising:
utilizing user interactions with the computing device to authenticate the user identity without requiring the user to input any security data, by collecting and monitoring sensory data in the background on the computing device.

8. The method of claim 5, comprising:
utilizing user interactions with the computing device to authenticate the user identity without requiring the user to input any security data, by collecting and monitoring sensory data in the background on the computing device;
wherein, if behavioral biometrics continue to classify the user as an authorized user, then the method does not require the user to provide any password or PIN or fingerprint and the method comprises performing user authentication in the background;

wherein, if said behavioral biometrics fail to continue to classify the user as the authorized user, then the method comprises asking the user to enter further security information.

9. A method comprising:
(a) monitoring touch-screen gestures of a user, that interacts with an online service via a touch-screen of a computing device, across multiple usage sessions;
(b) monitoring acceleration and tilt of said computing device, during said touch-screen gestures;
(c) extracting data-points from the monitoring performed in step (a) and from the monitoring performed in step (b);
(d) performing classification of said data-points, and generating a user-specific profile that indicates a characterizing acceleration and a characterizing tilt of the computing device during said touch-screen gestures;
(e) subsequently, monitoring touch-screen gestures that are performed via the touch-screen of the computing device during access to said online service; and monitoring accompanying acceleration and tilt of said computing device;
(f) extracting data-points from information monitored in step (e);
(g) analyzing the data-points extracted in step (f), and checking whether said data-points match said user-specific profile generated in step (d);
(h) if the checking of step (g) has a negative result, then: generating a notification that a user that interacted in step (e) with the computing device to access said online service, is different from the user that interacted in step (a) with the computing device to access said online service;
wherein generating said user-specific profile comprises:
generating a user-specific profile that is based on at least:
(i) a characteristic of background tremor of the computing device during monitored touch-screen gestures, and
(ii) a characteristic of curvature of monitored touch-screen gestures, and
(iii) a characteristic of landscape/portrait device orientation during monitored touch-screen gestures, and
(iv) a characteristic of touch-location coordinates of monitored touch-screen gestures, and
(v) a characteristic of touch-pressure of monitored touch-screen gestures.

10. The method of claim 9,
wherein the computing device is a device selected from the group consisting of:
a laptop computer, a personal computer, a desktop computer, a mobile computing device, a mobile telephone, a tablet.

11. The method of claim 9, comprising:
utilizing user interactions with the computing device to authenticate the user identity without requiring the user to input any security data, by collecting and monitoring sensory data in the background on the computing device.

12. The method of claim 9, comprising:
utilizing user interactions with the computing device to authenticate the user identity without requiring the user to input any security data, by collecting and monitoring sensory data in the background on the computing device;
wherein, if behavioral biometrics continue to classify the user as an authorized user, then the method does not require the user to provide any password or PIN or fingerprint and the method comprises performing user authentication in the background;

wherein, if said behavioral biometrics fail to continue to classify the user as the authorized user, then the method comprises asking the user to enter further security information.

\* \* \* \* \*